US005841399A

United States Patent [19]
Yu

[11] Patent Number: 5,841,399
[45] Date of Patent: Nov. 24, 1998

[54] FAULT DETECTION AND EXCLUSION USED IN A GLOBAL POSITIONING SYSTEM GPS RECEIVER

[75] Inventor: Jimmy Y. Yu, Olathe, Kans.

[73] Assignee: AlliedSignal Inc., Morristown, N.J.

[21] Appl. No.: 838,571

[22] Filed: Apr. 10, 1997

Related U.S. Application Data

[60] Provisional application No. 60/020,845 Jun. 28, 1996.

[51] Int. Cl.$^6$ .............................. H04B 7/185; G01S 5/02
[52] U.S. Cl. ........................................... 342/357; 701/213
[58] Field of Search ............................. 342/357; 701/213

[56] References Cited

U.S. PATENT DOCUMENTS

| 5,200,829 | 4/1993 | Geier . |
| 5,202,829 | 4/1993 | Geier ...................................... 364/449 |
| 5,317,514 | 5/1994 | Bancroft et al. . |
| 5,436,632 | 7/1995 | Sheynblat .............................. 342/357 |

OTHER PUBLICATIONS

Understanding GPS: Principles and Applications; Chapter 7: 7.3.3 Integrity Enhancement Techniques, pp. 306–320.

R. Grover Brown, "GPS RAIM: Calculation of Thresholds and Protection Radius Using Chi–Square Methods—A Geometric Approach", RTCA Paper No. 491–94//SC159–584, Nov. 7, 1994.

Young Lee, "Appendix B Baseline Fault Detection and Exclusion Algorithm", RTCA Paper No. 116–95/SC159–627, Feb. 8, 1995.

Elliot D. Kaplan, "Understanding GPS Principles and Applications", Mobile Communications Series, 1996 Artech House, Inc.

R. Grover Brown, "A Baseline GPS RAIM Scheme and a Note on the Equivalence of Three RAIM Methods", Navigation: *Journal of The Institute of Navigation*, vol. 39, No. 3 Fall 1992.

Lee, Y.C.; "Receiver Autonomous Integrity Monitoring (RAIM) Capability For Sole Means GPS Navigation in the Oceanic Phase of Flight": 500 Years After Columbus—Navigation Challenges of Tomorrow, Monterey, CA Mar. 23–17, 1992; Jan. 1, 1992.

Virball, V.G. et al; "A GPS Integrity Channel Based Fault Detection and Exclusion Algorithm Using Maximum Solution Separation" Position Location and Navigation Symposium (PLANS), Las Vegas, Apr. 11–15, 1994.

Pervan, B.S. et al; Parity Space Methods For Autonomous Fault Detection and Exclusion: IEEE 1996 Position Location and Navigation Symposium (PLANS 1996) Apr. 22–24, 1996.

*Primary Examiner*—Theodore M. Blum

[57] ABSTRACT

A fault exclusion (FE) system for a global positioning system (GPS) receiver which upon detection of a faulty satellite, for example, by a fault detection (FD) system, such as a receiver autonomous integrity monitoring (RAIM) system. The FE system computes the test statistics for all satellites and ranks the satellites in descending order of their test statistics. The FE system excludes data from the satellites one at a time starting with the satellites at the top of the list. Should a subsequent satellite anomaly be detected, the FE system excludes satellites based on the test statistics computed for the previous satellite anomaly condition. The FE system proceeds down the list until the fault detection condition is cleared or the list is exhausted without affecting the availability of the FD system.

17 Claims, 1 Drawing Sheet

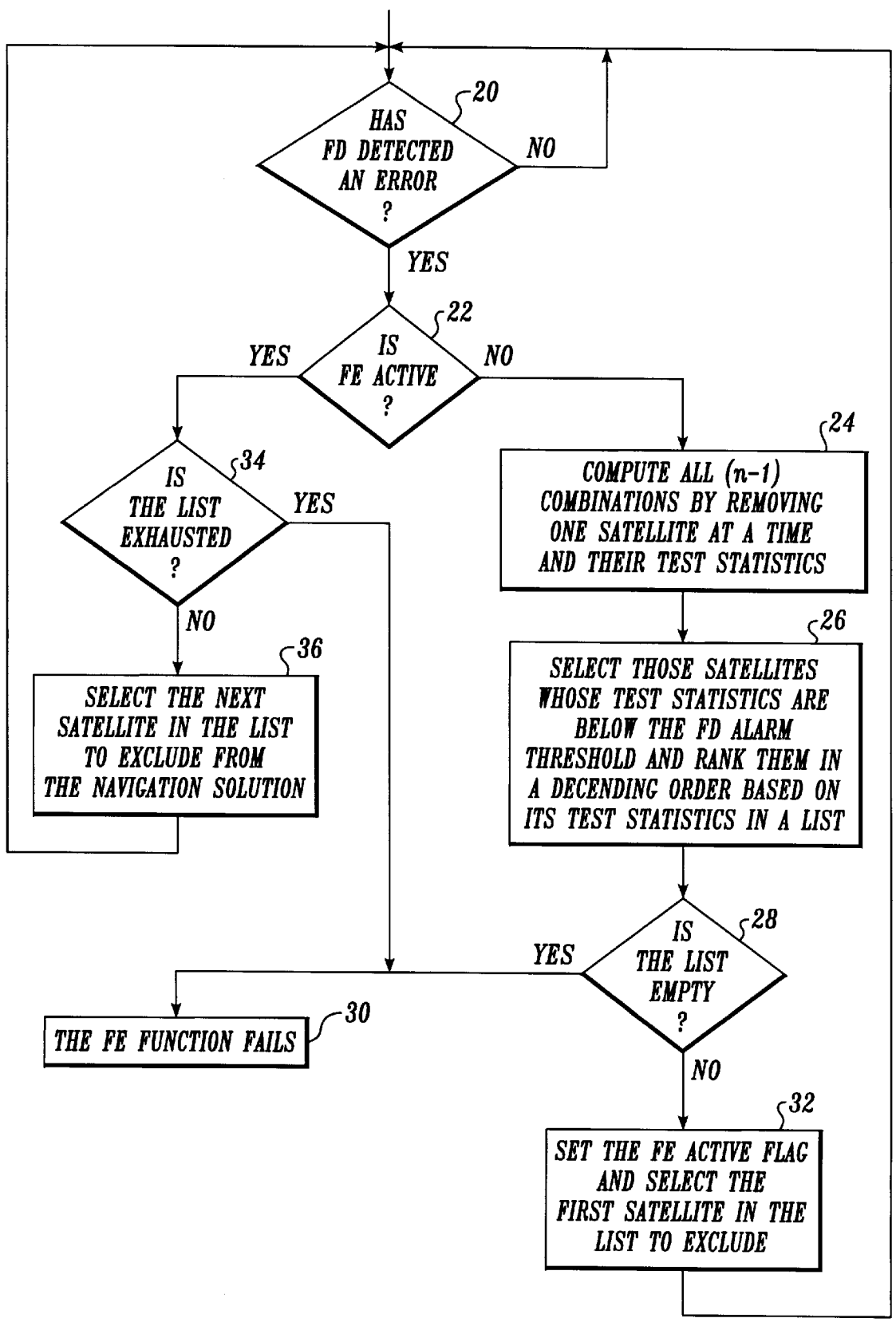

FAULT DETECTION AND EXCLUSION USED IN A GLOBAL POSITIONING SYSTEM GPS RECEIVER

This application is based upon and claims priority of U.S. Provisional Application Number 60/020,845, dated Jun. 28, 1996.

BACKGROUND OF THE INVENTION

1. Field of the Invention

The present invention relates to a fault exclusion (FE) system for a global positioning system (GPS) receiver and more particularly to an FE system that upon detection of a fault, for example, by a fault detection (FD) system, such as a receiver autonomous integrity monitoring (RAIM) system, computes test statistics for all of the possible subsets of satellites, removing one satellite at a time. The test statistics for each of the subsets are ranked in decreasing order in a list. The subsets with the lowest test statistics below a test statistic threshold are used to exclude a faulty satellite. Should a subsequent fault be detected indicating that the test statistic exceeds the threshold at a later time, due to, for example, changing geometry, the FE system utilizes the previously determined list of test statistics to exclude a satellite.

2. Description of the Prior Art

Global positioning systems (GPS) are known to be used for navigation in various applications including aircraft guidance and marine harbor navigation where relatively accurate position data is required. The GPS includes a nominal 24 satellite constellation, positioned in six earth centered orbital planes; a ground control/monitoring network; and user receivers. The GPS satellites are known to use direct sequence spread spectrum modulation for transmission of ranging signals and other navigational data. The ranging signals broadcast by the satellites are pseudorandom noise (PRN) signals which are replicated by the GPS receivers. The replicated ranging signals generated by the GPS receivers are subject to significant errors due to anomalies in the clocks in the GPS satellites and receivers.

Each GPS satellite broadcasts two types of PRN ranging codes: a short course acquisition (C/A) code and a long precision (P) code. The C/A code is known to have a 1 millisecond period, while the P code has a 7-day period. Both codes repeat constantly. Encrypted P-codes are also known. Such encrypted P-codes are known as Y codes.

Various aircraft use the GPS as a primary navigation system. However, due to inaccuracies in the navigational data due to various GPS anomalies, such aircraft are also provided with an alternate navigational system to be used during GPS anomaly conditions. In particular, for aircraft traveling at relatively high speeds, incorrect position data can cause significant deviations from the intended flight path when the GPS is used as the primary navigational system. As such, some GPS receivers are provided with a self contained receiver autonomous integrity monitoring (RAIM) system for detecting satellite anomalies which can cause incorrect position data to be transmitted to the GPS receivers. When a satellite anomaly is detected, a warning is generated to enable another on-board navigation system to used or the faulty satellite to be excluded from the navigational solution. The RAIM system is discussed in detail in "Understanding GPS Principles an Applications", Artech House Publishers, 1996, pages 306–314; and "A Baseline GPS RAIM Scheme and a Note on the Equivalence of Three RAIM Methods", by R. Graver Brown, *Journal of the Institute of Navigation*, Vol. 39, No. 3, Fall 1992, pages 301–315, hereby incorporated by reference.

Normally at least five satellites or four satellites and an altitude input are required. The RAIM system detects incorrect position data from a particular satellite using a least squares residual (LSR) method by cross checking the residuals of the pseudorange measurements for the suspect faulty satellite with at least five other satellites or four other satellites and an altitude input. Using the LSR method, five equations for four unknowns (east, north, up aircraft position and aircraft receiver clock bias). Since five equations are used to solve for four unknowns, the system is considered to be overdetermined. GPS systems are also disclosed in U.S. Pat. Nos. 5,202,829; 5,317,514 and 5,436,632.

Such systems are known to require six or more satellites in order to provide acceptable position data. In order to determine if any of the satellites are providing faulty positional data, a test statistic threshold is computed. The test statistic of the system is then compared with the test statistic threshold. Any time the test statistic exceeds the test statistic threshold a faulty satellite is indicated. Upon detection of a faulty satellite, one satellite at a time is removed from the navigational solution. Test statistics for each of the subsets of satellites are then computed and ranked in a list in descending order. The test statistics are then used to select a satellite subset in order to remove a faulty satellite. Should a subsequent fault be detected, i.e., the test statistic being greater than the test statistic threshold, another satellite anomaly is indicated. The previously excluded satellite is included and one satellite at a time is then excluded to enable the test statistics for each of the various subsets of satellites to be recomputed. The test statistics are again ranked in a list in descending order. The satellite subsets with the lowest test statistic are then used to select the satellite to exclude.

Unfortunately, if the wrong satellite was initially excluded, for example, due to changing geometries, the recalculation of the test statistic if a subsequent fault is detected may result in a condition where the navigational solution is contaminated and none of the subsets of satellites result in a test statistic that is less than the threshold.

SUMMARY OF THE INVENTION

It is an object of the present invention to solve various problems in the prior art.

It is yet another object of the present invention to provide a fault exclusion (FE) system for use in global positioning system.

Briefly, the present invention relates to a fault exclusion (FE) system for a global positioning system (GPS) receiver that is initiated by the detection of a satellite anomaly, for example, by a receiver autonomous integrity monitoring (RAIM) system. The FE system computes the test statistics for all satellites and ranks the satellites in descending order of their test statistics. The FE system excludes data from the satellites one at a time, starting with the satellites at the top of the list, proceeding down the list until the fault detection condition is cleared or the list is exhausted.

DESCRIPTION OF THE DRAWINGS

These and other objects of the present invention will become readily understood with reference to the following specification and attached drawings wherein:

The sole figure is flow diagram of the fault exclusion system in accordance with the present invention.

DETAILED DESCRIPTION

The present invention relates to a fault exclusion (FE) system for a global positioning system (GPS) receiver which provides improved availability of the system. When incorrect navigational data is detected by a fault detection (FD) system, such as a receiver autonomous integrity monitoring (RAIM) system, the FE system in accordance with the present invention utilizes the test statistics previously computed for the last satellite anomaly condition in order to decide which satellite to exclude.

The RAIM system, as discussed above, is a self-contained integrity monitoring system which provides a warning when a GPS satellite anomaly is detected. Upon detection of a satellite anomaly by the FD system, the FE system excludes the data from the satellite providing the incorrect navigational data from the navigation solution according to criteria discussed below to enable the GPS to continue to be used as the primary navigational system. The RAIM system uses an overdetermined solution to detect a satellite anomaly and thus requires at least five satellites (up to eight satellites), or four satellites plus an altitude input. The RAIM availability is checked typically at a 1 Hz rate.

More specifically, the RAIM system uses a least squares residual (LSR) regression analysis to solve five equations for four unknowns. The residuals are squared and summed to form a test statistic. The test statistic is then compared with a predetermined threshold. If the test statistic exceeds the predetermined threshold, a warning is provided which indicates a satellite anomaly. To reduce the effect of high frequency noise or the test statistic, the test statistic may be averaged over a several second period.

The detection probability of the RAIM system can be improved by eliminating bad satellite-receiver geometries. In order to detect the satellite with an anomaly, one satellite at a time is removed and the test statistics are computed for all of the various subsets of satellites. In other words, n solutions of n−1 satellites are performed. More particularly, the horizontal dilution of precision HDOP is determined n times, each with n−1 satellites to determine the change in the HDOP, defined as dHDOP. The HDOP change (dHDOP) with a satellite omitted may provided in equation (1):

$$dHDOP_i = \sqrt{a_i^{\#T} a_i^{\#}/q_{ii}} \quad \text{for } 1 \le i \le n \tag{1}$$

where $a_i^{\#}$ is the $i_{th}$ column of the matrix $A(A^TA)^{-1}A^T$; and $q_{ii}$ is the $i_{th}$ diagonal element of the matrix $$Q(Q=1-A(A^TA)^{-1}A^T)$$

A is a line of site matrix a follows:

$$A = \begin{bmatrix} -U_{1x} & -U_{1y} & -U_{1z} & i \\ -U_{2x} & -U_{2y} & -U_{2z} & 1 \\ -\ddot{U}_{nx} & -U_{ny} & -U_{nz} & i \end{bmatrix}$$

where, the components $U_n$ are the components of the line of site vector from the $n^{th}$ satellite. To have a good detection probability, the $dHDOP_{max}$ must meet the criteria set forth in equation (2).

$$dHDOP_{max} < \frac{\epsilon_{max}}{\sqrt{T + 3\sigma}} \tag{2}$$

where

T is the threshold of the test statistic used in the RAIM LSR analyses; σ is the deviation of the standard availability (SA) and receiver losses; and $\epsilon_{max}$ is the maximum allowable position error.

Alternatively, the $DHOP_{max}$ threshold may be determined as set forth below as generally described in: "GPS RAIM: CALCULATION OF THRESHOLDS AND PROTECTION RADIUS USING CHI-SQUARE METHODS-A GEOMETRIC APPROACH", by R. GROVER BROWN, RTCA Paper No. 491–94/SC 159–584, hereby incorporated by reference. In this method, the $dHDOP_{max}$ threshold is determined by Monte Carlo simulation based upon a miss detection rate and the number of satellites in view. The simulation is based upon a miss detection rate of 0.001 with an optimal 21 satellite constellation using the worst case in the most difficult satellite to detect. Points are sampled every 3 degrees of latitude and 180 nautical miles in longitude. Each point is sampled, for example ever 5 minutes for 12 hours. Typical $dHOP_{max}$ thresholds for different phases of flight are provided below in the table.

| | dHOP$_{max}$ thresholds | | |
|---|---|---|---|
| Number of Satellite | En Route | Terminal | Non-Precision |
| 5 | 267.5 | 66.6 | 6.2 |
| 6 | 245.9 | 61.9 | 5.5 |
| 7 | 210.6 | 53.0 | 5.1 |
| 8 | 199.9 | 50.0 | 4.5 |

For each computation, least squares residual (LSR) regression analysis is used to solve for an unknown position dx, defined in equation (3):

$$dx=(A^TA)^{-1}A^Tdp \tag{3}$$

The LSR vector $r_i$ for each position computation is provided by equation (4):

$$r_i=dp-Adx \tag{4}$$

where $r_i$ is a n×1 vector between 5 and 8.

The four most recent LSR vector residuals are averaged to form an average residual vector $r_{avg}$ to reduce the effects of high frequency noise as set forth in equation (5):

$$r_{avg} = \frac{r_1 + r_2 + r_3 + r_4}{4} \tag{5}$$

The test statistic (ts) may then be calculated by summing the squares of the n components of the average residual vector $r_{avg}$ as set forth in equation (6):

$$ts=(r_{avg}[1])^2+(r_{avg}[2])^2+\ldots+(r_{avg}[n])^2 \tag{6}$$

The test statistic (ts) is not normalized in equation (6). When no fault is present, the statistical distribution of the test statistic (ts) is independent of geometry which means that the solution for the test statistic (ts) is non-singular. If the test statistic (ts) is normalized by the square of the deviation ($\sigma^2$) the test statistic (ts) will have a chi-square distribution with n−4 degrees of freedom. The chi-square distribution function with n degrees of freedom is provided by equation (7):

$$f(x) = \frac{1}{2^{n/2}\Gamma(n/2)} x^{(n/2)-1}\epsilon^{-X/2}; \text{ for } x > 0 \tag{8}$$

for x>0 where Γ is the gamma function as set forth in equation (8).

$$\Gamma(t) = \int_0^\infty X^{i-1} e^{-x} dx \qquad (9)$$

The test statistic (ts) is independent of satellite geometry. The value of deviation σ is defined as the combination of selective availability (SA) and receiver noise; $\sigma_{SA}=32.5$ and $\sigma_{RCVR}=15$. The receiver noise may be averaged over 4 samples. As set forth in equation (9), the net contribution of receiver noise deviation $\sigma_{RCVR}$ 7.5.

$$\sigma_{RCVR} = 15/\sqrt{4} = 7.5 m \qquad (14)$$

Thus, the deviation is given by equation (10):

$$\sigma = \sqrt{32.5^2 + 7.5^2} = 33.3 m \qquad (15)$$

The maximum allowable false alarm rate is one alarm per 15,000 samples or 0.002/hr. Allowing for independent samples every two minutes, assuming the correction time for selective availability is 120 seconds, the claim rate per sample is 1/15,000 per sample.

The test statistic threshold is determined based on the deviation σ, the alarm and the degrees of freedom.
Thus, if six satellites are in view, the degree of freedom is 2(6-4). The chi-square function is given by equation (11):

$$f(x) = 0.5\, e^{-x/2} \qquad (17)$$

For an alarm rate per sample of 1/15,000, the normalized threshold is given by equation (12) while the un-normalized distribution is given by equation (13):

$$T = 2\, \ln(15,000) = 19.23 \qquad (18)$$

$$U = [19.23 \times (33.3)^2] = 21325.74 \qquad (19)$$

The RAIM FD system described above detects satellite anomalies when the test statistic for a satellite exceeds a threshold as discussed above. Anytime a satellite anomaly is detected by the FD system, a warning is generated. The fault exclusion (FE) system excludes the data of the satellite with the anomaly from the navigation computations to enable continued use of the GPS as a primary navigation system.

The FE system requires at least six satellites or five satellites and an altitude input for proper operation. The availability of the FE system is checked, for example, at a 1 Hz rate; the same as the FD system. The FE system is thus able to exclude faulty satellite data without affecting the availability of the FD system which requires five satellites or four satellites and an altitude input as discussed above.

Upon detection of a satellite anomaly from the FD system, the FE system ranks each satellite by its test statistic (ts) in descending order and maintains a list of satellites whose test statistics (ts) are below the threshold. The FE starts at the top of the list and excludes data from the corresponding satellites one at a time going down the list until the FD system no longer detects a satellite anomaly (i.e., the test statistic is less than the test threshold). Should the list become exhausted, the loss of the FE system is indicated.

An important aspect of the invention relates to the condition when a subsequent satellite anomaly is detected. Rather than recalculate the test statistics as discussed above for all of the satellite subsets, the previously removed satellite is re-inserted into the navigational solution. The system then selects the satellite subset using the list of test statistics calculated for the previous satellite anomaly.

Referring to FIG. 1, the system first checks in step 20 whether the FD system, for example, the RAIM system discussed above, detected a satellite anomaly. Since the FE system only functions when a satellite anomaly is detected by the FD system, the FE system loops back to step 20 and waits for a satellite anomaly to be detected. If a satellite anomaly has been detected by the FD system, the FE system determines if the FE system is active in step 22. If the FE system was not previously active, the test statistic for each satellite subset is computed, removing one satellite at a time, in step 24, as discussed above. After the test statistics are computed, the test statistics are each compared with a threshold, as discussed above. The satellite subsets are ranked in descending order of their test statistics in step 26. Initially, the satellite subsets with test statistics below the threshold are used for navigational computations while any satellite subsets with a test statistic above the threshold is excluded, as discussed above. As mentioned above, the FE system proceeds down the list of satellite subsets one at a time for satellite subsets with a test statistic less than the test statistic threshold until the list is exhausted. Thus, the FE system checks in step 28 whether any satellites are contained in the list in step 26. If there are no satellites in the list, the FE system proceeds to step 30 and indicates a loss of the FE system. If it is determined in step 28 that the list is not empty, the FE system proceeds to step 32 and sets an FE active flag and excludes the data from the first satellite in the list. After the data from the first satellite in the list is excluded, the system loops back to step 20 to determine if the FD system is still detecting a satellite anomaly. If the FD system no longer detects a satellite anomaly, the GPS receiver utilizes the data from the non-excluded (n−1) satellites to enable the GPS to continue to be used as the primary navigation system and continuously loops back to step 20 to await another satellite anomaly to be detected by the FD system. If the FD system continues to detect a satellite anomaly after the data from the satellite at the top of the list is excluded, the FE system checks the FE status flag in step 22. If the FE status flag was set in step 32, indicating a previous satellite anomaly and a satellite anomaly is currently detected by the FD system, the FE system utilizes the list of test statistics computed for the previous satellite anomaly and determines if the list is exhausted in step 34. If so, the system proceeds to step 30 and indicates a FE system failure. If not, the system proceeds to step 36. In this step the previously excluded satellite is reinserted. The system then proceeds down the list computed in step 26 for the previous anomaly and selects the satellite subset with the next lowest test statistic in order to select a satellite to exclude. The system then loops back to step 20 to determine if the test statistic for the satellite subset selected in step 36 is less than the test statistic threshold. If so, the system loops back to step 20. If not, the system proceeds to steps 22 and 34 and selects another satellite to exclude based on the list computed in step 26. The system repeats this cycle until the list is exhausted or the test statistic becomes less than the test statistic threshold.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A fault detection and exclusion system for detecting satellite anomalies in a global positioning system (GPS) and excluding the data from the satellite with the anomaly from the navigation solution, the system comprising:

means for detecting a first and a second satellite anomaly;

means for computing the test statistics for a predetermined number of satellites at least when said first satellite anomaly is detected; and means for excluding data from one of the satellites, when said second satellite anomaly is detected, as a function of the test statistics calculated for said first satellite anomaly condition.

2. The fault detection and exclusion system as recited in claim 1, wherein said excluding means includes means for ranking the satellites in descending order as a function of the computed test statistic.

3. The fault detection and exclusion system as recited in claim 2, further including means for excluding satellites in order of descending test statistics until the satellite anomaly is no longer detected or the list is exhausted.

4. The fault detection and exclusion system as recited in claim 2, further including means for checking for satellite anomalies after each of said satellites is excluded.

5. The fault detection and exclusion system as recited in claim 1, wherein said detecting means includes a receiver autonomous integrity monitoring (RAIM) system.

6. A fault exclusion system for use with a detection system which detects satellite anomalies for GPS receiver for excluding data from a satellite providing incorrect navigational data, the system comprising:

means for computing the test statistics for a predetermined number of satellites; and means for excluding data from satellites during a later satellite anomaly condition as a function of the test statistic computed for a previous satellite anomaly condition.

7. The fault exclusion system as recited in claim 6, further including means for ranking the satellites in descending order according to the computed test statistics.

8. The fault exclusion system as recited in claim 7, wherein said excluding means is responsive to said ranking means for excluding satellites in descending order test statistics until said satellite anomaly is no longer detected.

9. The fault exclusion system as recited in claim 7, further including means for comparing said test statistics with a predetermined threshold and maintaining a list of satellites whose test statistics are less than said predetermined threshold.

10. The fault exclusion system as recited in claim 6, further including means for enabling said fault exclusion system only when said fault detection system has detected a satellite anomaly.

11. The fault exclusion system as recited in claim 7, wherein said fault exclusion system is only enabled when a predetermined number of satellites are available.

12. The fault exclusion system as recited in claim 11, wherein said predetermined number of satellites is at least six.

13. The fault exclusion system as recited in claim 9, wherein said fault exclusion system is enabled only when five satellites and an altitude input are available.

14. A method for excluding data from a GPS satellite after a satellite anomaly has been detected, the method comprising the steps of:

(a) computing the test statistics of each of the satellites;

(b) excluding data from a satellite as a function of the test statistics; and (c) excluding data from a satellite upon detection of a subsequent satellite anomaly based on the test statistics computed for a previously detected satellite anomaly.

15. The method as recited in claim 14, wherein said test statistics are ranked in a list in descending order and said satellites are excluded one at a time starting from the top of the list until a satellite anomaly is no longer detected.

16. The method as recited in claim 15, further including the step of:

comparing the test statistics with a predetermined threshold and identifying those test statistics below said predetermined threshold.

17. A method for excluding data from a GPS satellite, comprising the steps of:

(a) receiving a signal from a plurality of GPS satellites;

(b) computing a first test statistic for said satellites;

(c) detecting a first anomaly condition based on said first test statistic;

(d) excluding one of said plurality of GPS satellites from a first navigation solution when said first anomaly condition is detected;

(e) computing a second test statistic for said GPS satellites wherein said second test statistic does not include a test statistic for said one GPS satellite excluded from said first navigation solution (f) detecting a second anomaly condition based on said second test statistic; and (g) determining a satellite to be excluded from a second navigation solution by evaluating said second test statistic and said test statistic for said one GPS satellite excluded from said first navigation solution.

* * * * *